United States Patent Office 3,420,446
Patented Jan. 7, 1969

3,420,446
AUTOMATIC WATERING DEVICE
Georges Marie Jacques Henry Emile Taudiere, Paris, France, assignor to La Culture Sans Terre S.A., Antes, Niort, Deux-Sevres, France, a society of France
Filed Oct. 6, 1966, Ser. No. 584,839
Claims priority, application France, Oct. 13, 1965, 34,865
U.S. Cl. 239—450    7 Claims
Int. Cl. A01g 27/00

ABSTRACT OF THE DISCLOSURE

The present invention relates to an automatic watering device comprised of a framework partially tubular in nature. A certain quantity of water is permanently retained in the framework. Calculated delivery of water from the water reserve in the framework is distributed in a dosed manner to a first tank and then to a second counterbalanced tank. The filling of the counterbalanced tank controls an inlet valve for supplying water to the framework and consequent distribution of the water from inside the framework through nozzles for spraying over seeds and/or plants supported by the framework.

---

The present invention is directed to an automatic watering device. The device includes a framework which is at least partially hollow. From internal portions of the framework, water is periodically and automatically sprayed through nozzles onto seeds or plants supported by the framework.

A water reserve is permanently retained within the framework. The water reserve is continuously fed in a dosed manner to a first tank. This dosage can be controlled so as to regulate the entire watering cycle. From the first tank, the water is fed in a dosed manner to a counterbalanced tank. The counterbalanced tank, upon movement, controls the introduction of more water into the framework and subsequent distribution by spraying on the seeds or plants.

It is an object of the present invention to rapidly obtain the conversion of seeds into grass or other plants without the intervention of human hands.

It is another object of the present invention to provide an automatic watering device which operates intermittently so as to grow seeds under the best growing conditions.

It is another object of the present invention to provide for regular automatic sprinkling by use of a pair of tanks, one of which is counterbalanced by a weight, whereby operation of the counterbalanced tank commences the sprinkling action.

It is another object of the present invention to provide a novel automatic watering device wherein the frequency of sprinkling may be varied as desired.

It is another object of the present invention to control an automatic watering device by means of an overflow tank assembly fed by a stream of water drop by drop until a tank overcomes the weight on a lever and thereby causes introduction of more water into the system.

It is another object of the present invention to provide an automatic watering device which includes means for introducing solid minerals and salts or fertilizers into the system.

Other objects will appear hereinafter.

For the purpose of illustrating the invention, there is shown in the drawings a form which is presently preferred; it being understood, however, that this invention is not limited to the precise arrangements and instrumentalities shown.

FIGURE 2 is a sectional view showing the righthand support frame.

Figure 10:
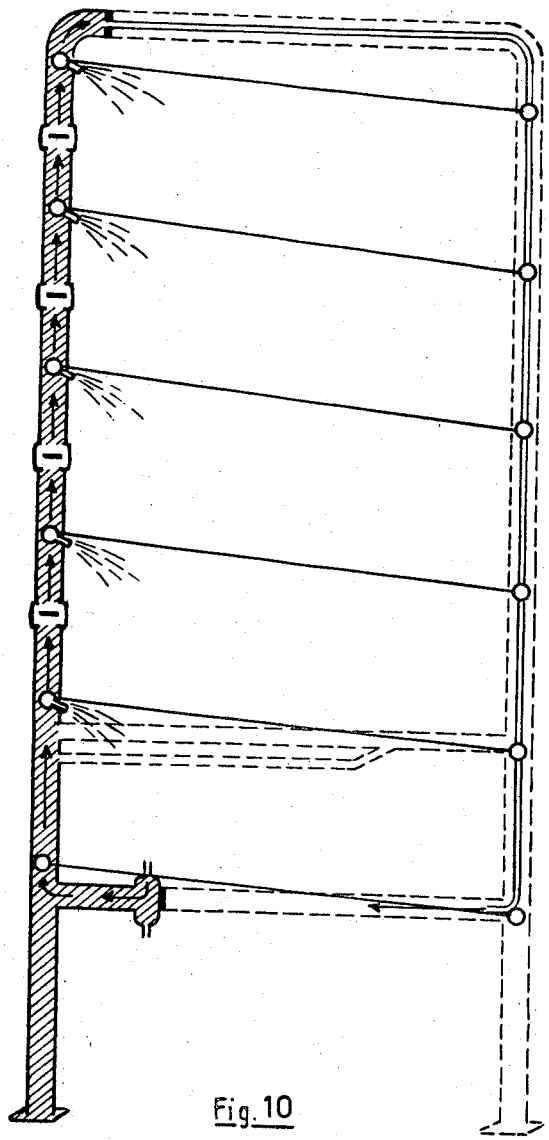
FIGURE 10 is a diagrammatic view illustrating the manner of sprinkling.

There is shown in the drawing an automatic watering device comprising a tubular frame. The frame is made up at its ends by vertical tubular members 1 and 2 having legs 3, 4, $3_1$ and $4_1$, respectively. Between the supports 1 and 2, there is superimposed at regular intervals shelves 5, 6, 7, 8, 9 and 10. The shelves slope from the rear to the front at an angle of approximately 8 degrees with respect to the horizontal as shown more clearly in FIGURE 10.

Figure 4:
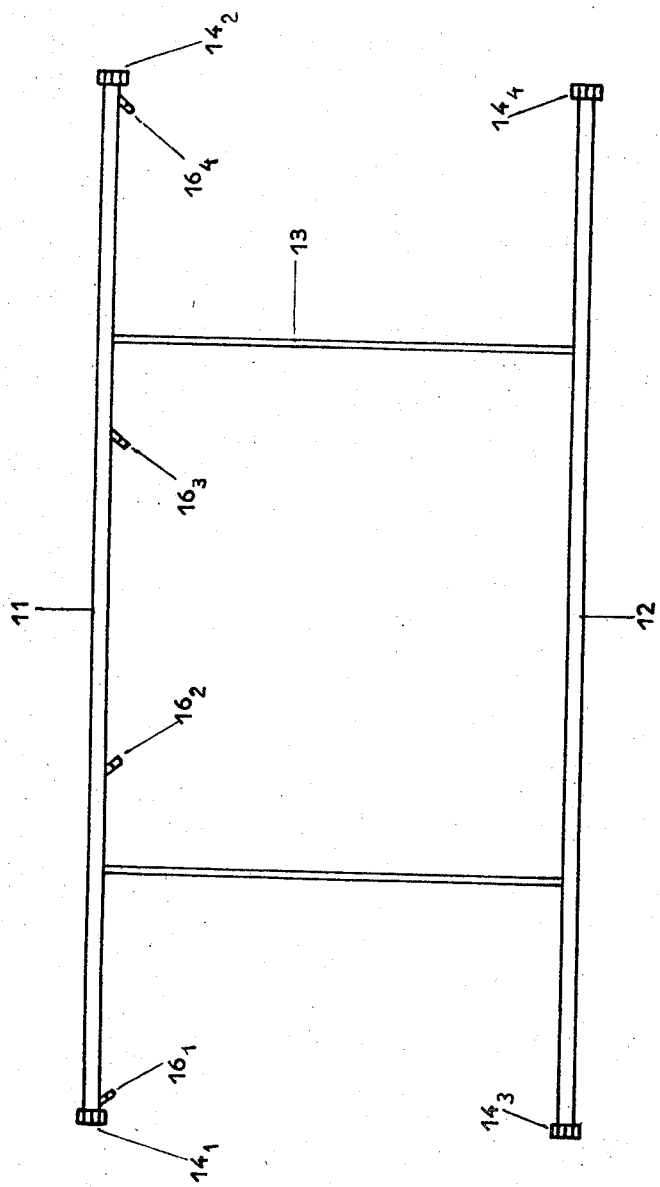
FIGURE 4 is a top plan view of the top shelf of the frame.

Each of the shelves consists of two longitudinal tubular members. The rear tubular member is designated as 11 and the front tubular member is designated as 12. The members 12 and 11 are interconnected by struts 13 so as to form a grid. The top shelf 5, see FIGURE 4, has only two such struts since it does not support anything, but rather only acts as a sprinkling source. The remaining shelves act as sprinklers and support the trays within which seeds may be germinated and grown.

Figure 1:
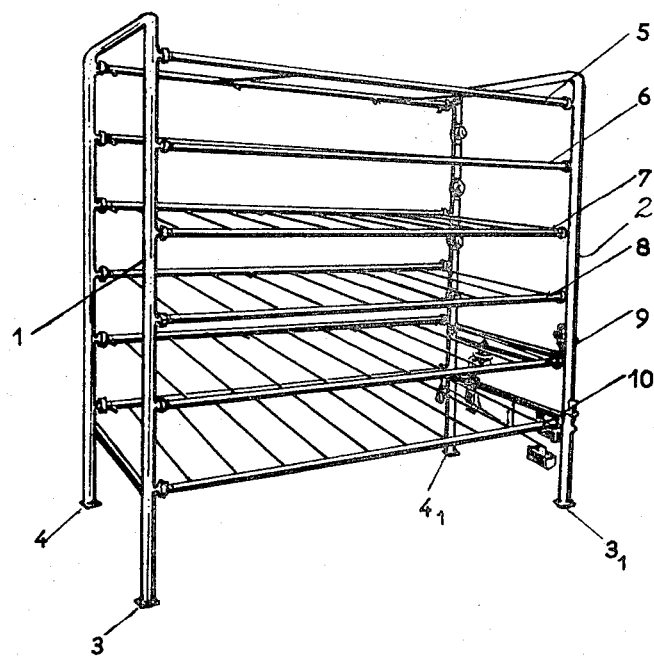
FIGURE 1 is a perspective view of the tubular frame for the watering device of the present invention.
Figure 2:
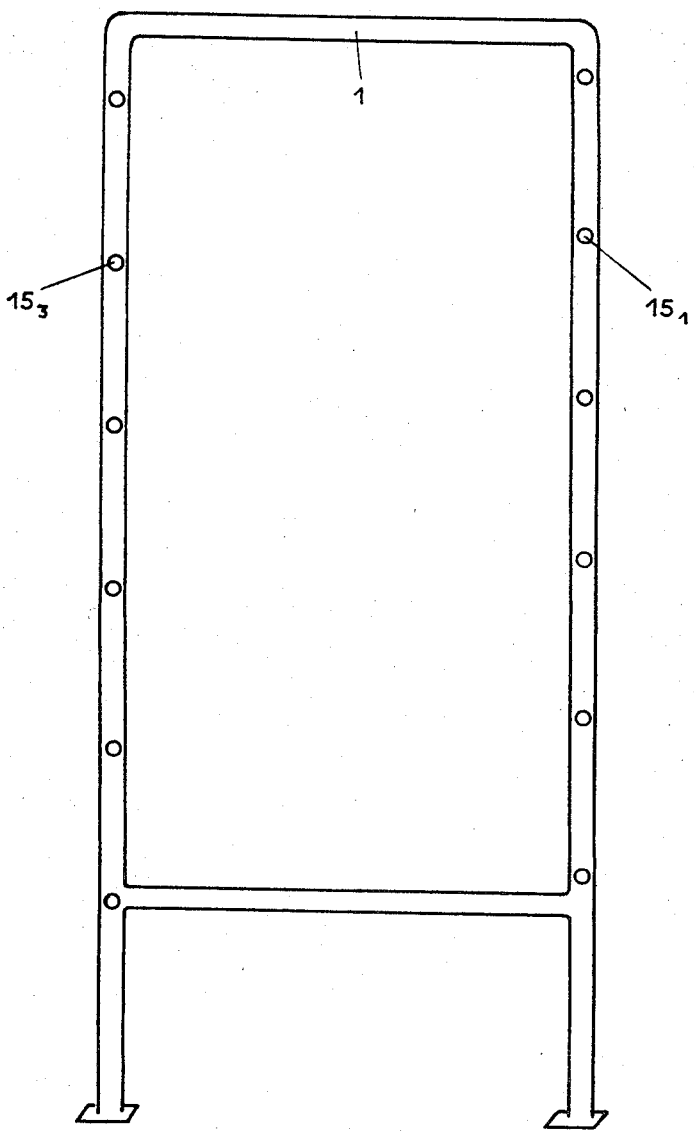
FIGURE 2 is a sectional view showing the lefthand end of the support frame.
Figure 3:
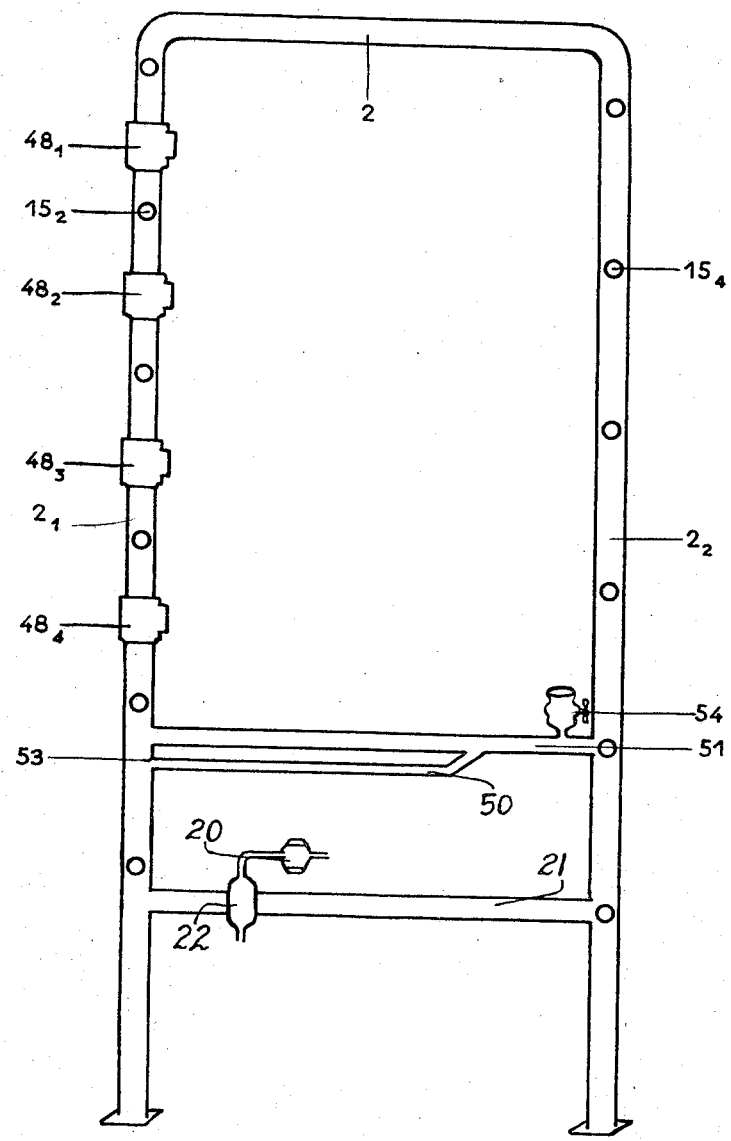

At the ends of each of the tubular members 11 and 12 of each shelf, there are provided connections $14_1$, $14_2$, $14_3$, and $14_4$. These connections are adapted to be coupled to mating connections $15_1$, $15_2$, $15_3$, and $15_4$, respectively, on the vertical tubular supports 1 and 2. See FIGURES 2 and 3.

The frame constructed in this manner is rigid and the trays are supported by the shelves so as to slope from rear to front. A water distribution system is partially disposed within a portion of the frame. That is, water is adapted to circulate inside the rear frame members 11 on each of the shelves and inside the righthand vertical tubular support 2. The other frame members incorporated in the frame are closed and do not form a part of the distribution system.

Figure 7:
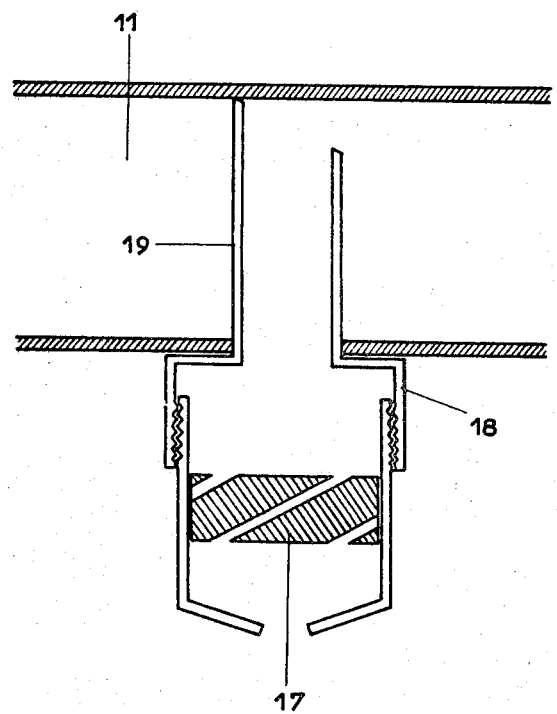
FIGURE 7 is a sectional view through a jet nozzle supported by a portion of the frame.

On each of the frame members 11, intended to act as a sprinkling ramp, jets $16_1$, $16_2$, $16_3$ and $16_4$ are provided. Each jet designated generally as 17 is interchangeable and as shown more clearly in FIGURE 7 is removably and interchangeably mounted within one end of a water pipe 18. The other end of water pipe 18 is designated as 19 and extends into the frame member 11. The end 19 is cut at a bevel.

Figure 8:
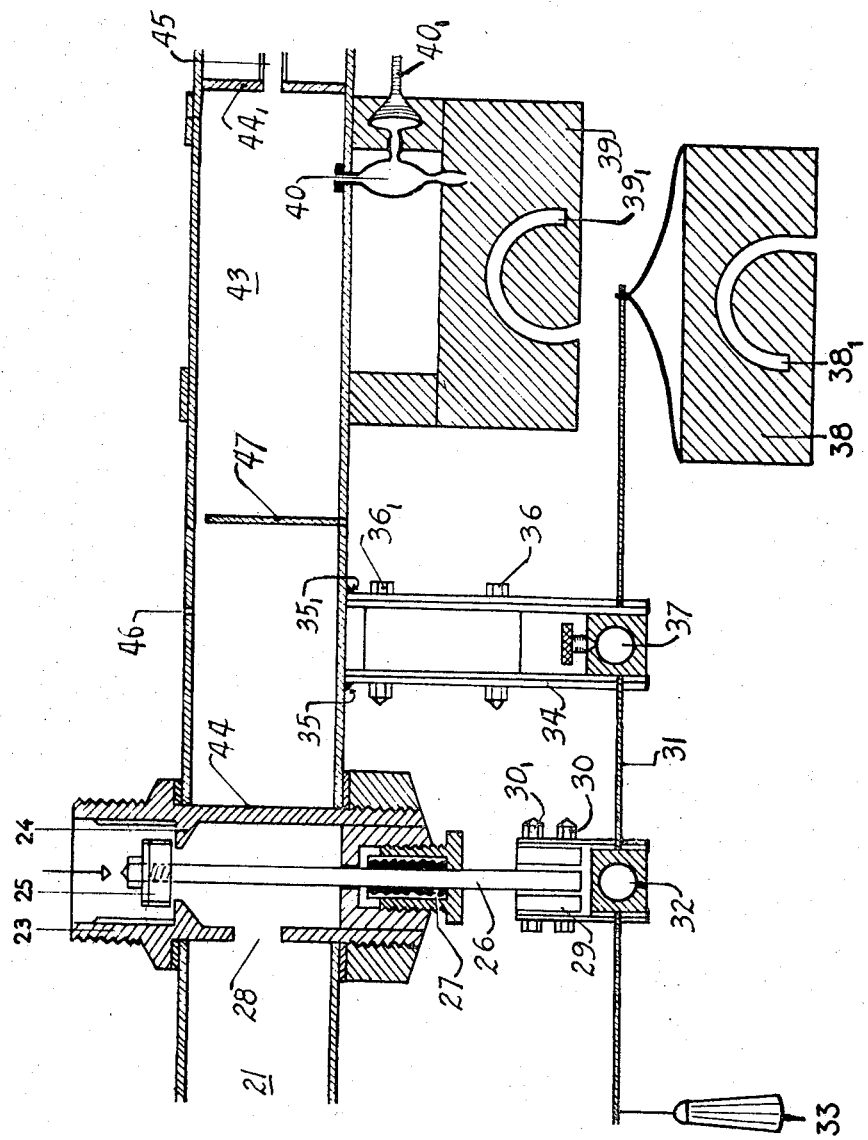
FIGURE 8 is an enlarged detail sectional view forming a part of one end of the frame.

The jets 17 are mounted sloping in a direction so that the water spray therefrom is uniformly distributed over the whole of the surface of the shelves placed therebeneath. As shown more clearly in FIGURE 4, the jets are orientated so as to have overlapping patterns of discharge. The vertical support 2 contains a water distribution system communicating with the rear frame members 11. The water distribution system includes a pressure regulator 20 coupled to a water inlet valve 22. Valve 22 is mounted on the horizontal tube 21 which extends between the legs of the support 2. The body 23 of the valve 22, as shown more clearly in FIGURE 8, traverses the tube 21 and is adjustably connected thereto by screws and washers.

The valve body 23 includes a valve seat 24 on which is supported a valve head 25. A valve stem extends from the valve head 25 through the body 23 and emerges from the bottom of the valve body through a stuffing box 27. An orifice 28 is provided on the side of the valve body 23 so as to communicate with the lefthand end of tube 21.

The lower end of stem 26 is connected to an adapter member 29 by bolts 30 and $30_1$. Member 29 is attached to a lever rod 31 adapted to oscillate about spindle 32. A weight 33 is attached to the lefthand end of rod 31. The weight 33 is sufficient to normally keep the valve head 25 pressed against the valve seat 24, thus closing the valve 22.

The lever 31 is supported by a pivot support 34 welded at 35 and $35_1$ to the lower surface of tube 21. Bolts 36 and $36_1$ attach the spindle 37 to the support 34. The lever rod 34 is suspended from the oscillates about spindle 37. A mobile tank 38 is suspended from the righthand end of lever 31.

The tank 38 is provided with a drain siphon $38_1$. A tank 39 is fixedly suspended from tube 21 by collars above the tank 38. Tank 39 is immobile and includes a drain siphon $39_1$ adapted to discharge into tank 38.

Above tank 39, a small diameter water intake passage is provided closed by valve 40. Opening of the valve 40 is controlled by a rod $40_1$. The extent of the opening of valve 40 is regulated by a pointer moving in front of a regulated dial whereby the discharge through valve 40 may be selectively controlled. Such discharge controls the cyclic operation of the sprinkling.

A water reserve tank 43 is formed in that part of tube 21 between the plates 44 and $44_1$. Plate 44 is welded in place flush with the water inlet valve 22. Plate $44_1$ is welded in place adjacent the vertical tube support 2. The water tank 43 is fed by means of a small diameter tube 45. Tube 45 is incorporated inside the tube support 2 and connects the tank 43 to a chamber disposed within the rear vertical tube support $2_1$. The latter support is provided with a plurality of one-way control valves as will be made clear hereinafter.

In the top of tank 43, there is provided a ventilation orifice 46. In the bottom of tank 43, there is provided a nozzle 47 cut with a bevel and thereby forming an automatic overflow control from tank 43. In the rear vertical part of the support 2, see FIGURE 9, there is provided four one-way control valves designated as $48_1$, $48_2$, $48_3$ and $48_4$. These valves are incorporated by simply threading them to adjacent portions of the tubular support for the purpose of maintaining a water reserve in this area. In the horizontal top part of the support 2, adjacent the corners, the support is closed by a plate 49 and through which extends one end of the tube 45. The other end of tube 45 extends through plate 44' and communicates with the tank 43.

The operation of the sprinkling device of the present invention is as follows:

Let it be assumed that the tank 38 is empty and thereby in its upper position, valve 40 is closed, and weight 33 is in its lowermost position, thereby closing the valve 22. The pressure from the main supply acts on the upper surface of valve head 28 and assists the weight 33 in maintaining the valve 22 closed. The rear vertical tube support $2_1$ is full of water. The one-way valves 48 are closed and tank 43 is full. The water level in tank 43 will correspond to the upper edge of the overflow nozzle 47.

The valve 40 will be adjusted to an open position so that water is delivered at a regulated drop-by-drop rate from tank 43 into tank 39. When the water level in tank 39 reaches a predetermined height, the drain siphon $39_1$ will be primed. When this occurs, the water is siphoned from tank 39 into tank 38. As the tank 38 is filled with water from tank 39, its weight increases to the point where it is sufficient to oscillate lever 31 in a clockwise direction in FIGURE 8. This raises the weight 33 and by way of the valve stem 26 raises the valve head 25. This opens valve 22.

Figure 9:
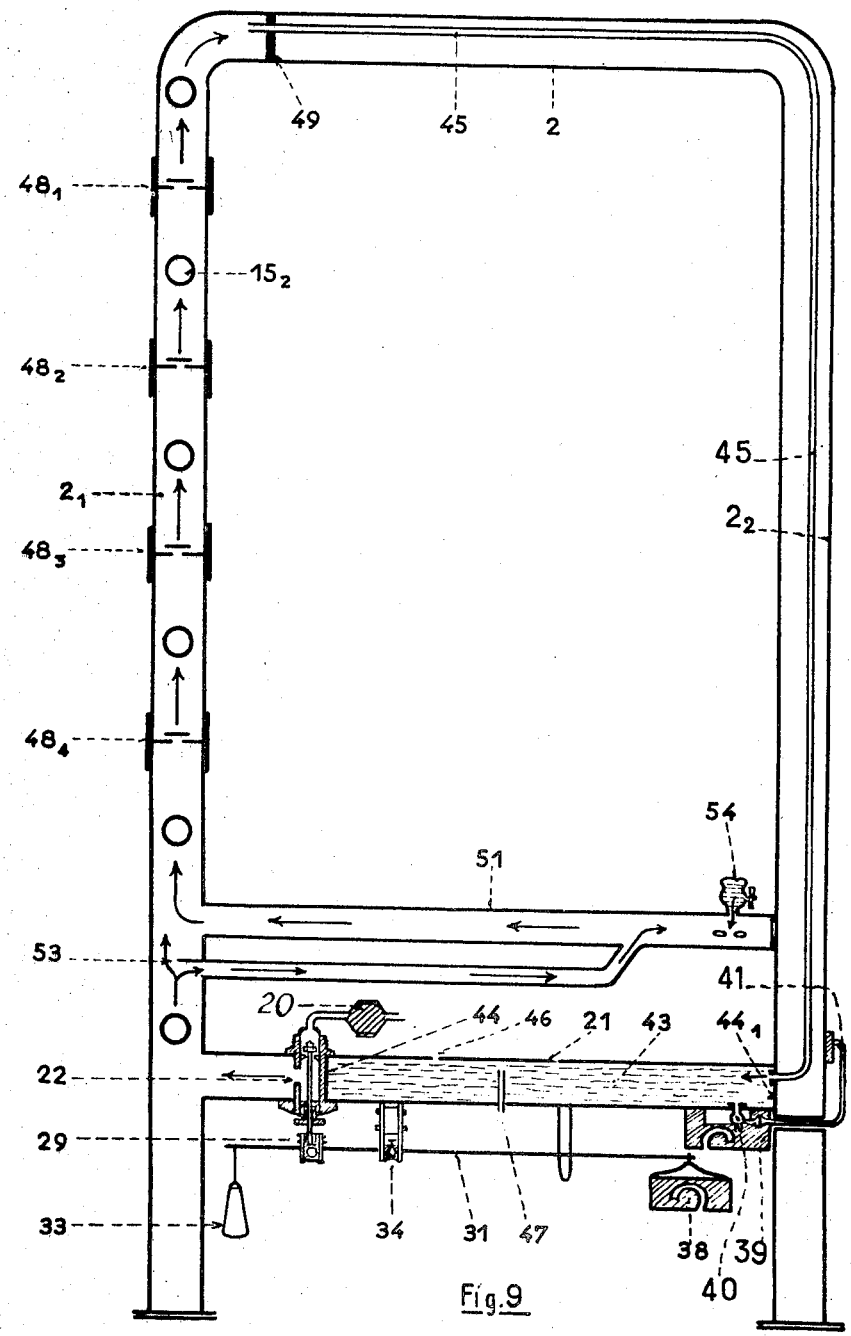
FIGURE 9 is a diagrammatic illustration of one end of the frame and the water distribution system therein.

The opening of valve 22 enables water at a predetermined pressure as determined by regulator 20 to enter the water distribution system of the frame and flow in the direction of the arrows indicated in FIGURE 9. The water flows upwardly through the support numeral $2_1$ and opens the one-way valve 48 and flows through the frame members 11 to the various jets which discharge water in the form of a sprinkler spray. At the same time, water flows through the conduit, through tube 45, and replenishes the supply in tank 43 up to the overflow nozzle 47.

During this time, the tank 38 continues to be filled until its own siphon $38_1$ is primed. When siphon $38_1$ is primed, the water is discharged from the tank 38 into any convenient receptacle or may even flow onto the ground. Thereafter, the weight of tank 38 is no longer sufficient to overcome the effect of weight 33. Hence, weight 33 rotates the lever 31 in a counterclockwise direction in FIGURE 8, thereby closing valve 22.

The number of possible sprinklings in a 24-hour period may be selected as desired by simply shifting the pointer in front of the dial to control the rate of flow through valve 40. For example, the number of sprinklings may be varied from twelve to forty-eight in a 24-hour period. At the rate of twenty-four sprinklings per day, the duration of each sprinkling may be thirty seconds with the quantity of water used being 3½ liters. At this rate, water consumed per day is 84 liters. This may be an important advantage for dry climate areas where water is scarce.

If desired, means may be provided for introducing solids such as mineral salts or fertilizer into the water circulation system. Mineral salts may be introduced in the form of 5-gram tablets. In this regard, there are provided tubes 50 and 51 which extend across the righthand end of the frame as shown more clearly in FIGURE 3. The tubes may be soldered in place and communicate at their lefthand end with the support $2_1$ so that water may circulate as indicated by the arrows in FIGURE 9. It will be noted that tube 50 is of smaller diameter than tube 51. The righthand end of the tube 50 communicates with tube 51. The righthand end of tube 51 is closed. A projection 53 is provided at the lefthand end of tube 50 so that a portion of the water will be caused to flow through tube 50 and into tube 51. An inlet valve means is provided at 54 for the introduction of tablets into tube 51.

The tablets may be introduced into tube 51 only once every 24-hour period. At that time, two or three such tablets may be introduced into tube 51. Under the flow of the water, the tablets will dissolve. When valve 22 is automatically opened, the flow of water through tubes 50 and 51 dissolves the tablets and enables the mineral salts to be automatically incorporated into the water that is sprayed through the jets described above.

Figure 5:
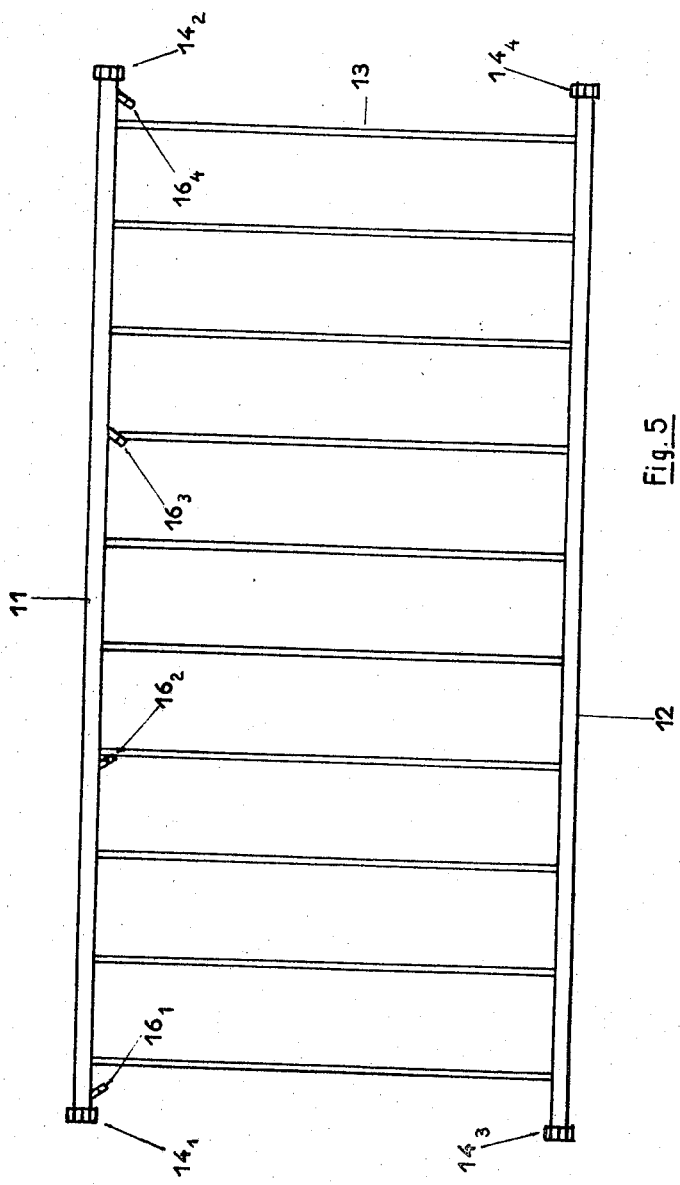
FIGURE 5 is a top plan view of the lowest shelf on the frame.
Figure 6:
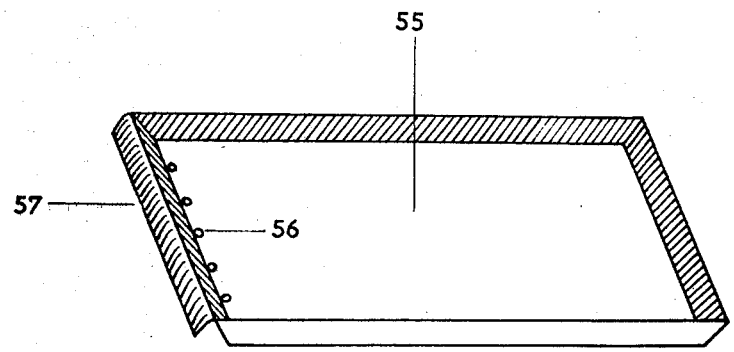
FIGURE 6 is a perspective view of a cultivating tray.

As shown more clearly in FIGURE 5, cultivating trays 55 are provided for support on the shelves. The trays 55 as illustrated are provided with a row of holes 56 along the handle 57. The holes 56 generally number 5 to 7 in quantity and insure the flow of sprinkling water as they are in the bottom part of the trays on the inclined plane defined by the shelves. The handles 57 are curved in the same manner as the front tubular frame members 12 to facilitate holding the trays in position.

The entire device of the present invention is preferably made of metal so that it may have a weight of approximately 240 pounds. If it is desired to reduce the weight of the device, other materials such as plastics may be utilized. The present invention is entirely automatic and may be utilized, for example, in growing herbage such as grass. The trays 55 may be cleaned in a rapid manner. Because of the structural interrelationship of the device, grass having a high chlorophyll content may be grown under cultivated conditions.

The present invention may be embodied in other specific forms without departing from the spirit or essential attributes thereof and, accordingly, reference should be made to the appended claims, rather than to the foregoing specification as indicating the scope of the invention.

It is claimed:

1. An automatic watering device comprising a framework made of tubes and at least a portion thereof having a water distribution system therein, water discharge points being provided at various parts on the framework for regularly watering seeds placed in the proximity of the discharge points and supported by the framework, said framework including means so that a certain quantity of water reserve will be permanently retained in a part of the framework, means for controlling discharge of said water reserve in a dosed manner into an overflow tank, said tank being positioned to discharge water in a dosed manner into a counterbalanced complementary tank, and means responsive to filling of the complementary tank for controlling introduction of water into the framework.

2. A device in accordance with claim 1 including a valve between the water reserve and the overflow tank, said valve being adjustable from outside the framework for controlling the rate of flow from the water reserve to the overflow tank.

3. A device in accordance with claim 1 including a tube disposed within the framework for providing communication between the water reserve and a supply area within the framework, and an overflow control associated with the water reserve.

4. A device in accordance with claim 1 including one-way valves provided in the framework between the inlet valve and the discharge points.

5. A device in accordance with claim 1 including means on the framework for introducing solid materials into the water circulation system for automatic discharge through said discharge points.

6. A device in accordance with claim 1 wherein said counterbalanced tank is mounted on a lever and opposed by a weight, and said inlet valve being coupled to said lever at a location adjacent a weight on said lever, with the pivot point of said lever being disposed between said location and said counterbalanced tank.

7. A device in accordance with claim 1 wherein said framework has a plurality of shelves disposed one above the other, each shelf having a discharge point for discharging on the shelf therebelow, each shelf being in a communication with said water distribution system at one end of said framework, and a nozzle at each discharge point.

References Cited

UNITED STATES PATENTS

| 3,085,364 | 4/1963 | Chapin | 239—65 |
| 3,199,784 | 8/1965 | Chapin | 239—65 |
| 3,272,225 | 9/1966 | Frampton | 239—65 |

EVERETT W. KIRBY, *Primary Examiner.*